United States Patent
Schäfer (10) Patent No.: US 7,991,506 B2
(45) Date of Patent: Aug. 2, 2011

(54) AUTOMATED ORDER-PICKING SYSTEM HAVING AN INTEGRATED SORTING FUNCTION AND METHOD FOR OPERATING THE SYSTEM

(75) Inventor: Gerhard Schäfer, Neunkirchen (DE)

(73) Assignee: SSI Schaefer Noel GmbH Lager-und Systemtechnik, Giebelstadt (DE)

( * ) Notice: Subject to any disclaimer, the term of this patent is extended or adjusted under 35 U.S.C. 154(b) by 0 days.

(21) Appl. No.: 12/568,918

(22) Filed: Sep. 29, 2009

(65) Prior Publication Data

US 2010/0036521 A1 Feb. 11, 2010

Related U.S. Application Data

(63) Continuation of application No. PCT/EP2008/002412, filed on Mar. 27, 2008.

(30) Foreign Application Priority Data

Mar. 30, 2007 (DE) .......................... 10 2007 016 453

(51) Int. Cl.
*G06F 7/00* (2006.01)
*B65H 29/00* (2006.01)
*B65H 1/00* (2006.01)

(52) U.S. Cl. ..... 700/216; 700/217; 700/219; 414/789.6; 414/790.9; 414/273; 414/280

(58) Field of Classification Search .......................... None
See application file for complete search history.

(56) References Cited

U.S. PATENT DOCUMENTS

| | | | |
|---|---|---|---|
| 5,953,234 A * | 9/1999 | Singer et al. | 700/214 |
| 6,061,607 A * | 5/2000 | Bradley et al. | 700/216 |
| 7,261,509 B2 | 8/2007 | Freudelsperger | |
| 2006/0229762 A1 | 10/2006 | Schaefer | |

FOREIGN PATENT DOCUMENTS

| | | |
|---|---|---|
| DE | 197 12 839 A1 | 8/1998 |
| DE | 202 11 321 U1 | 1/2003 |
| DE | 10 2004 014 378 A1 | 10/2005 |
| DE | 10 2004 058 216 A1 | 6/2006 |
| EP | 1 743 852 A1 | 1/2007 |

* cited by examiner

*Primary Examiner* — Gene Crawford
*Assistant Examiner* — Yolanda Cumbess
(74) *Attorney, Agent, or Firm* — McNeely, Hare & War LLP; Kevin J. McNeely (57) ABSTRACT

An automated order-picking system for conveying article units towards a workstation, including at least one storage rack having a plurality of storage locations for receiving load supports, on which or in which article units are stored, preferably by one sort only, wherein the storage rack is divided into rack regions, wherein each of the rack region comprises a plurality of rack planes which respectively comprise a plurality of storage locations being arranged side-by-side, one endlessly rotating central conveyor, particularly a conveyor belt, being arranged along a longitudinal side of the storage rack and preferably between two storage racks, and which is divided into a plurality of windows, a number of vertical elevators being arranged one behind the other along the longitudinal side of the storage rack, and which respectively comprise one load suspension device for receiving and delivering of at least one of the storage units.

18 Claims, 4 Drawing Sheets

AUTOMATED ORDER-PICKING SYSTEM HAVING AN INTEGRATED SORTING FUNCTION AND METHOD FOR OPERATING THE SYSTEM

RELATED APPLICATIONS

This is a continuation application of the co-pending international application PCT/EP2008/002412 (WO 2008/119497 A1) filed on 27 Mar. 2008 which claims priority of the German patent application DE 10 2007 016 453.1 filed on 30 Mar. 2007, which is fully incorporated by reference herewith.

TECHNICAL FIELD

The present invention relates to an automated order-picking system having an integrated sorting function for conveying article units or packing units in accordance with a pre-determined sequence towards a workstation, particularly towards a packing station.

The present invention further relates to a corresponding method for providing different article units or packing units of the automated order-picking system in accordance with the pre-determined sequence.

BACKGROUND

Recently, more and more the phenomenon can be observed that the order-picking systems requirements, particularly in the field of retail, are getting higher and higher with respect to the performance of the system. The number of picking orders to be processed each day rises steadily. The number of pieces per order line decreases, but the total numbers of pieces are increasing each day. This means that modern order-picking systems have to handle bigger and bigger picking-order performances, wherein the requirements with respect to the dynamics are getting higher and higher. Previously, if branches have waited up to one week until they have transmitted their orders (in a corresponding size) to a central warehouse, nowadays (a lot of smaller) orders are occasionally issued in an hourly rhythm. This means that at the end of the order-picking systems one has to react flexibly. Request peaks have to be balanceable by a corresponding performance.

Typically, corresponding order-picking systems are operated in accordance with the principle of "goods-to-man", in order to allow provision of the required output. Now, if a number of smaller orders is to be processed with a spectrum of articles which gets broader and broader, bigger warehouses and more and more storage movements are required for allowing collection of article units or packing units (in accordance with a picking order) and shipping preparation. For example, a bottle of water is a typical article unit. For example, a box of water is a typical packing unit. A number of water boxes can form a storage unit. A storage unit is a handling unit as employed in the warehouse. A storage unit is typically provided by one sort only (for example only water boxes), but can comprise articles of different types as well. The storage unit typically comprises a load support (pallet, tray, container, etc.) and the load (for example, one layer of water boxes).

A storage movement is a process during which a storage unit is moved between two storage elements, for example, between a rack and a storage machine.

All these requirements increase the handling effort while picking orders are processed in order-picking systems of the type discussed here. Therefore, one tries to obtain a maximum of automation.

The sequence according to which the article units or packing units are provided at the packing station is to be considered as another criterion. The customer either wants the articles to be packed in a pre-given sequence on a shipping pallet or into a shipping container, in order to allow removal (at the customer's site) in accordance with a desired sequence, or the customer wants light and fragile articles to be packed last or on top. Huge numbers of pieces require provision of the articles at a sufficient velocity and in the right sequence (i.e. sequencing is required) at the packing station.

The German patent application DE 197 12 839 A1 exactly deals with this kind of problems, and proposes, for the purpose of solving them, an automated order-picking system comprising a container warehouse having racks, a conveyor (elevator at front ends of the racks) for transportation of containers from the container warehouse to a plurality of order-picking stations, and a distribution system provided therebetween.

Although the system proposed in the document DE 197 12 839 already achieves relatively high performances (transportation of containers per hour), performance requirements, as to be fulfilled nowadays, cannot be achieved therewith. This is reasoned in that the distribution system has to supply articles or containers to many workstations. On the other hand, additional vertical buffers have to be installed in respective conveyor branches between the distribution system and the workstations, in order to allow the sequencing. The distribution system—and therefore also the warehouse being arranged in front of it—sometimes conveys articles, or better to say containers, in a non-sequenced manner towards the workstations, because the warehouse—under the required performance—would not be capable of outputting sufficient containers in the right sequence within the pre-given time. Further, it is required that containers, which have been transported to the workstation for the purpose of removing articles, are transported back in the rack again after the removal of articles. This happens also via the loop-like distribution system so that the transportation performance of the distribution system is correspondingly decreased, since the transportation of the articles in both directions occurs via the same track.

Another conventional order-picking system, working in accordance with the principle of "goods-to-man", is disclosed in the German patent application DE 10 2004 014 378 A1.

There, so-called storage containers are transported from a container warehouse to an order-picking station. An operator removes articles from the container, and puts them in so-called picking buckets. The picking buckets are arranged above a conveyor belt. As soon as all of the articles required for processing a picking order have been collected in one of the picking buckets (manually), the picking bucket opens downwards, and releases the articles on the conveyor belt. The conveyor belt itself is endlessly rotating, and provided with a plurality of separation strips on its surface. The separation strips separate the conveyor belt into a plurality of sections allowing collection of articles, all belonging to one picking order. The separation strips prevent a mixing of articles belonging to different picking orders. The conveyor belt delivers the so-collected articles at an end thereof to so-called order containers. Also this system is not capable of providing the order-picking performance required today. Additionally, in this system the size of articles, which can be handled, is heavily limited by the bucket size.

The German patent application DE 10 2004 058 216 A1 relates to a picking-order arrangement, particularly dedicated to drugstores, having at least one rack comprising a plurality of rack compartments each of which is formed to receive an article, particularly a drug, and at least one movable transportation device connected to a positioning device and adapted to receive an article and to move same into a rack compartment.

SUMMARY OF THE INVENTION

In the light of these problems in the prior art, it is an object of the present invention to provide an automated order-picking system having an integrated sorting function, and a method for operating same, which overcomes the above-mentioned drawbacks.

This object is solved in accordance with the present invention by means of an automated order-picking system having an integrated sorting function for conveying article units in accordance with a pre-determined sequence to a workstation, wherein the order-picking system comprises: at least one storage rack having a plurality of storage locations for receiving load supports on which or in which article units are stored, particularly by one sort only; an endlessly rotating central conveyor, particularly a conveyor belt, which is arranged along a longitudinal side of the storage rack, and particularly between two storage racks, and which is divided in a plurality of windows, a number of vertical elevators being arranged one behind the other at the longitudinal side of the storage rack and which respectively comprise a load suspension device for receiving and delivering of at least one load support, wherein each of the vertical elevators is coupled to the central conveyor belt at a handing-over level; and a superordinated control device, which controls the vertical elevators such that the vertical elevators retrieve load supports being provided in the storage rack, transport same to the handing-over level, and deliver one or more article units, which are stored in or on the retrieved load supports, towards the central conveyor belt so that all the article units, which are required for processing a picking order at the workstation, are located in the pre-determined sequence on the central conveyor, after the central conveyor has passed all of the vertical elevators.

The present invention employs an endlessly rotating central conveyor, and divides same along the length thereof into, preferably equally sized, window regions, into which article units are delivered which have been retrieved from the warehouse beforehand. The big advantage of the present invention is to be seen in the great performance of the system. Each hour, 10,000 article units and more can be delivered to the workstation with the system of the present invention, namely in the right sequence. At the workstation, preferably one single, stream of article units arrives, which does not need to be coordinated and united with other streams of articles, in order to provide all of the article units required at the workstation. The central conveyor is fed with load supports—and thus also with the corresponding article units—by the plurality of vertical elevators. The vertical elevators as such represent a sequencing stage. Since the racks of the present invention are typically divided into different rack regions respectively comprising rack planes, additional sequencing stages can be integrated by the selection of a specific rack plane or rack region (long or short path up to the vertical elevator or the central conveyor). The spectrum of articles, which is present in the warehouse, is enormous. Articles often can be provided several times in the warehouse. The selection option represents another sequencing stage with respect to which article is actually used for processing a picking order.

Articles or load supports can be retrieved from the warehouse, already sequenced, and delivered to the central conveyor by means of the arrangement of the vertical elevators along the longitudinal side as well as the great spectrum of articles.

In accordance with a preferred embodiment a conveyor, particularly a segmented conveyor track, is arranged between each of the vertical elevators and the central conveyor. Preferably, a number of conveyor tracks (for example, to the left and right of the vertical elevator) can be provided as well.

This represents another sequencing stage, since the conveyor track can be used as a buffer by which the articles are delivered to the central conveyor in a cycled manner. If the vertical elevator were directly connected to the central conveyor, then the vertical elevator would need to wait, if necessary, until the window being assigned to the delivered article passes the vertical elevator.

The delivery of the article units from the vertical elevator to the central conveyor or to the conveyor track preferably happens in an automated manner. For this purpose, an unloading device is used, which is fully automated and integrated into the load suspension device of the vertical elevator. This unloading device allows that merely the article units are delivered but not the load supports. Transfer of the load supports from the vertical elevator to the conveyor track or to the central conveyor does not happen. The prior-art problems associated with the transport back of the load supports is thus eliminated. Further, less staff is required.

Additionally, it is preferred if a number of central conveyors are arranged on top of each other.

This measure allows that the vertical elevators deliver article units at different planes. This is particularly advantageous if the vertical elevators are provided with a number of load suspension devices being arranged on top of each other. While a first load suspension device delivers article units at a first plane, another load suspension device can deliver articles at another plane. Alternatively, article units of one load support can also be delivered to a number of planes (orders). For this purpose, the load suspension device has to travel to different planes one after the other. Preferably, the load supports are completely emptied in this context, i.e. all of the article units are delivered so that no storing back of the load supports is required any longer. Several orders can be served parallely by a repeated delivery, the orders having been organized beforehand by the control device. If required, the load suspension device can also receive (loaded) load supports at the same time, for managing the supply towards the warehouse.

The performance of the rack is so great that articles or load supports can be delivered for several working stations simultaneously. This is another reason why a number of central conveyors are arranged on top of each other, since then a number of workstations can be supplied with articles from one and the same warehouse or storage rack simultaneously.

In accordance with another embodiment a manual unloading station is provided at an end of the central conveyor, which is arranged oppositely to the working station, wherein the unloading station is supplied with load supports from the warehouse by at least one vertical elevator.

If the spectrum of article comprises ("ugly") articles, which are difficult to handle with machines—for example due to their packaging or their outer dimensions—it is recommendable to be capable of using humans for the manual unloading process. For this purpose one or more of the vertical elevators are adapted to allow an operator the manually retrieve an article being presented on the load suspension device of the vertical elevator. The removed articles, then, can be put manually on the central belt, namely into windows provided for this purpose. Alternatively, again conveyor tracks can be provided between these vertical elevators and the central conveyor, which transport the manually removed articles towards the central conveyor.

The manual unloading stations are preferably located at a start of the endlessly rotating central conveyor, in order to facilitate to the human the dispensing on the central conveyor of the grabbed articles, since none of the windows is yet occupied by another article at the start. Of course, the manual unloading stations could also be arranged further downstreams. Then, the dispensing of the grabbed articles on a free window would, however, be more complicated, since a neighbouring window could sometimes be occupied, requiring higher concentration of the operating personal.

In accordance with a preferred embodiment another elevator is provided between the manual unloading station and the central conveyors. Further, particularly additionally, clocked conveyor tracks, being arranged sequentially, could be provided between this elevator and the respective central belt, the conveyor tracks serving in turn as buffers between this plane elevator and the respective central conveyors. Even if any plane elevator is provided, i.e. if only one single central conveyor is served, additional sequenced conveyor belts, being arranged sequentially, can be provided between the discharging belts of the vertical elevators and the central conveyor, in order to also provide a buffer for manually unloaded articles before being dispensed on the central conveyor.

By means of this elevator manually unloaded article units can be distributed to the different planes of the central conveyor.

Further, the above-mentioned object is solved by a method for providing in a pre-determined sequence, different article units of an order-picking warehouse comprising at least one storage rack having a plurality of storage locations, which serve for receiving load supports containing the different article units, a plurality of vertical elevators being arranged along the longitudinal side of the storage rack, and an endlessly rotating central conveyor for conveying article units to a workstation, wherein the central conveyor is arranged along a longitudinal side of the storage rack, the method comprising the following steps: determining, which article units in the order-picking warehouse are required for processing a picking order; determining, where the required article units are stored in the storage rack; moving load supports, which contain the required article units, to handing-over locations, assigned to the vertical elevators, in the storage rack; retrieving the load supports from the handing-over locations by means of the vertical elevators and moving the load supports to a handing-over level of the central conveyor; dividing the central conveyor into a plurality of windows; assigning one or more of the required article units to each window; handing over of the article units, being delivered by the vertical elevator, to the central conveyor, if a corresponding assigned window of the central conveyor passes the vertical elevator; and coordinating all of the above actions such that an article unit is moved in a window assigned thereto in time.

In this manner many articles of a broad spectrum of articles can be delivered to a central conveyor, particularly one central conveyor for each workstation, namely in the pre-determined sequence. The method of the present invention is characterized by high dynamics and a high performance. The sequencing already happens during the retrieval of the article units from the rack. A sequencing by means of the central conveyor is no longer required. The articles located on the central conveyor are already sequenced. Thus, the central conveyor can also supply only one single workstation with articles.

The subdivision of the central conveyor in windows allows a high degree of planning in advance.

In accordance with a preferred embodiment the delivery of the required article units from the retrieved load supports towards the central conveyor happens in an automated manner in the vertical elevator, preferably by a tray unloading device cooperating with a load suspension device of the vertical elevator.

Thus, it is no longer required that the operating personnel move down the article units from the load supports and manually deliver them on the central conveyor. The delivery of the article units happens in an automated manner. The load supports are no longer transported to the workstation. A transporting back is, thus, not required neither. Thus, more article units can be transported to the workstation in the same time.

Additionally, it is advantageous if the method comprises the further steps of: determining, to which of the vertical elevators a load support is to be handed over; and moving the load support to a corresponding handing-over location.

This measures represent one of the above-mentioned sequencing stages.

In accordance with another embodiment the method comprises the steps of: determining, if a number of load supports in the storage rack contains the required article units; and selecting one vertical elevator and one of the load supports, if a number of load supports is present, so that the article units located on the selected load support are moved in time to the central conveyor within a temporal frame determined by the step of coordinating.

This measure represents another sequencing stage. Additionally, it ensures a higher flexibility, if an article unit is needed at short notice at the workstation.

Another advantage is to be seen in that the article units are packed in shipping units at the workstation, wherein the articles to be packed are particularly transported only via the central conveyor to the workstation.

Hence, there is only one single article stream from the warehouse to the workstation. A plurality of article streams does not need to be coordinated and brought together at the workstation, in order to achieve the desired sequence.

It is clear that the above-mentioned and hereinafter still to be explained features are not only be used in the respectively given combination, but also in other combinations or alone, without departing from the scope of the present invention.

BRIEF DESCRIPTION OF THE DRAWINGS

Embodiments of the invention are illustrated in the drawings and will be explained in more detail in the following description, wherein.

DETAILED DESCRIPTION OF EMBODIMENTS

In the following description of the embodiments' same features in the drawings will be designated by the same reference numerals.

Figure 1:
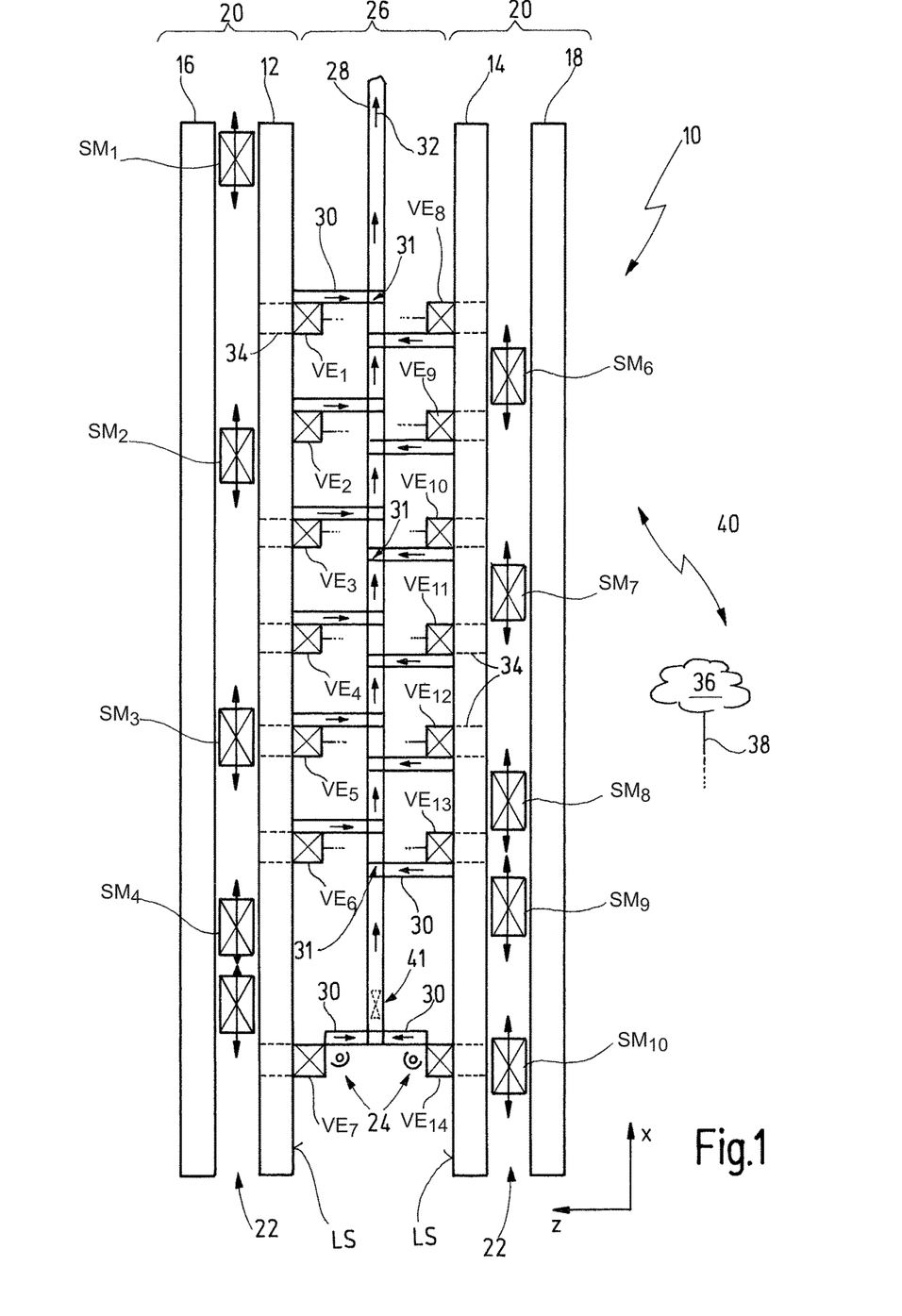
FIG. 1 shows a top view of an order-picking system of the present invention having a centrally arranged central conveyor.

FIG. 1 shows a top view of an embodiment of an order-picking system 10 in accordance with the present invention.

There are shown four storage racks 12, 14, 16 and 18 in total, wherein the storage racks 12 and 16 as well as the storage racks 14 and 18 respectively form a warehouse 20, particularly a tray warehouse. Respectively one rack aisle 22 is arranged between the respective storage racks, in which an arbitrary number of storage machines $SM_i$ can move in an x-direction and (not depicted) y-direction within rack regions (not depicted here). At opposite longitudinal sides LS of the warehouses 20, respectively a plurality of vertical elevators $VE_i$ (i=1, . . . , 10) is arranged. The vertical elevators $VE_1$-$VE_7$ connect to the longitudinal side LS of the tray warehouse 20 being depicted at the left of FIG. 1. The vertical elevators $VE_8$-$VE_{14}$ connect to the longitudinal side LS of the warehouse 20 being depicted at the right-hand side of FIG. 1.

The arrangement of such an order-picking system is described in detail in the German patent application DE 10 2006 025 620.4, which was filed by the applicant of the present application on May 24, 2006. The arrangement of the racks, while using storage machines and the vertical elevators, is described therein in detail. With respect to detailed questions relating to the arrangement and the function it is referred to the just mentioned application.

As already mentioned above, the warehouse 20 used here is particularly used as a tray warehouse. In this case, the used load support is a tray, preferably having the base area of a (Europool) pallet. A pallet layer is used as a storage unit. The supply of the tray warehouse 20 can be done, for example, through a neighbouring high-bay warehouse (not depicted here) dedicated to pallets. At the site of the high-bay warehouse, pallets being loaded with a plurality of article units are depalletized (in one layer) on trays. The trays being loaded with one pallet layer are subsequently transported to the tray warehouse 20, and stored and retrieved there by means of the storage machines. The concept of using trays loaded with one pallet layer (as a load) is explained in detailed in the German application DE 10 2006 025 618.2, which is incorporated herewith by reference, and was filed by the applicant on May 24, 2006.

Returning to FIG. 1, picking persons 24 are stationed at the vertical elevators $VE_7$ and $VE_{14}$, the picking persons being able to act in the warehouse aisle 26 between the two racks 20. The picking persons 24 are provided optionally. If articles, which are heavy to handle, are stored in the warehouses 20, then the picking persons 24 can load these articles manually onto a central conveyor 28 being arranged centrally between the warehouses 20. For this purpose, optionally, conveyor tracks 30 can be used so that the articles merely need to be removed from the vertical elevator and given on the conveyor track 30.

All of the vertical elevators are, preferably, connected respectively to at least one conveyor track 30, which can be used as a buffer (operated in a cycled manner) for injecting articles on the endlessly rotating central conveyor 28. This happens at so-called injection points or handing-over points 31. In the figure, respectively one conveyor track 30 is shown for each vertical elevator. However, articles can also be delivered from the vertical elevator to the left and right (and/or at a front-end).

In the example shown in FIG. 1, the articles are transported upwards from below along a main conveyance direction 32 to a workstation (not depicted here), particularly to a packing station as described in detail in the German patent application DE 10 2006 025 617.4, which is incorporated by reference and was filed by the applicant on May 24, 2006.

The streaming direction of the articles is schematically indicated in the figures by black arrows in a supporting manner.

All actions (storage movements and articles movements) in the system 10 are coordinated by a superordinated warehouse management computer 36. This control device regulates the flow of the load supports—and the article units—by actuating different regulating elements such as the storage machines SM, the vertical elevators VE or the conveyor tracks 30 (which are operated preferably in a cycled manner). The storage machines SM retrieve load supports from the racks 12-18, and deliver them at handing-over locations 34 in the racks 12 or 14, which are arranged opposite to the vertical elevators VE. The vertical elevators VE in turn retrieve the load supports, and transport them preferably to the level of the central conveyor 28, which is particularly realized by an endlessly rotating central conveyor belt. The vertical elevators VE deliver article units, located on the load supports, to the central conveyor 28. This preferably happens by means of an automated unloading device as disclosed, for example, in the German patent application DE 10 2006 039 697.9, which is explicitly incorporated by reference. Further, the conveyor tracks 30 are preferably used between the elevators and the central conveyor, the conveyor tracks also representing buffers.

Corresponding commands are transmitted by the warehouse management computer 36 either via fixed lines 38 or wireless connections 40 to the corresponding regulating elements.

Figure 3:
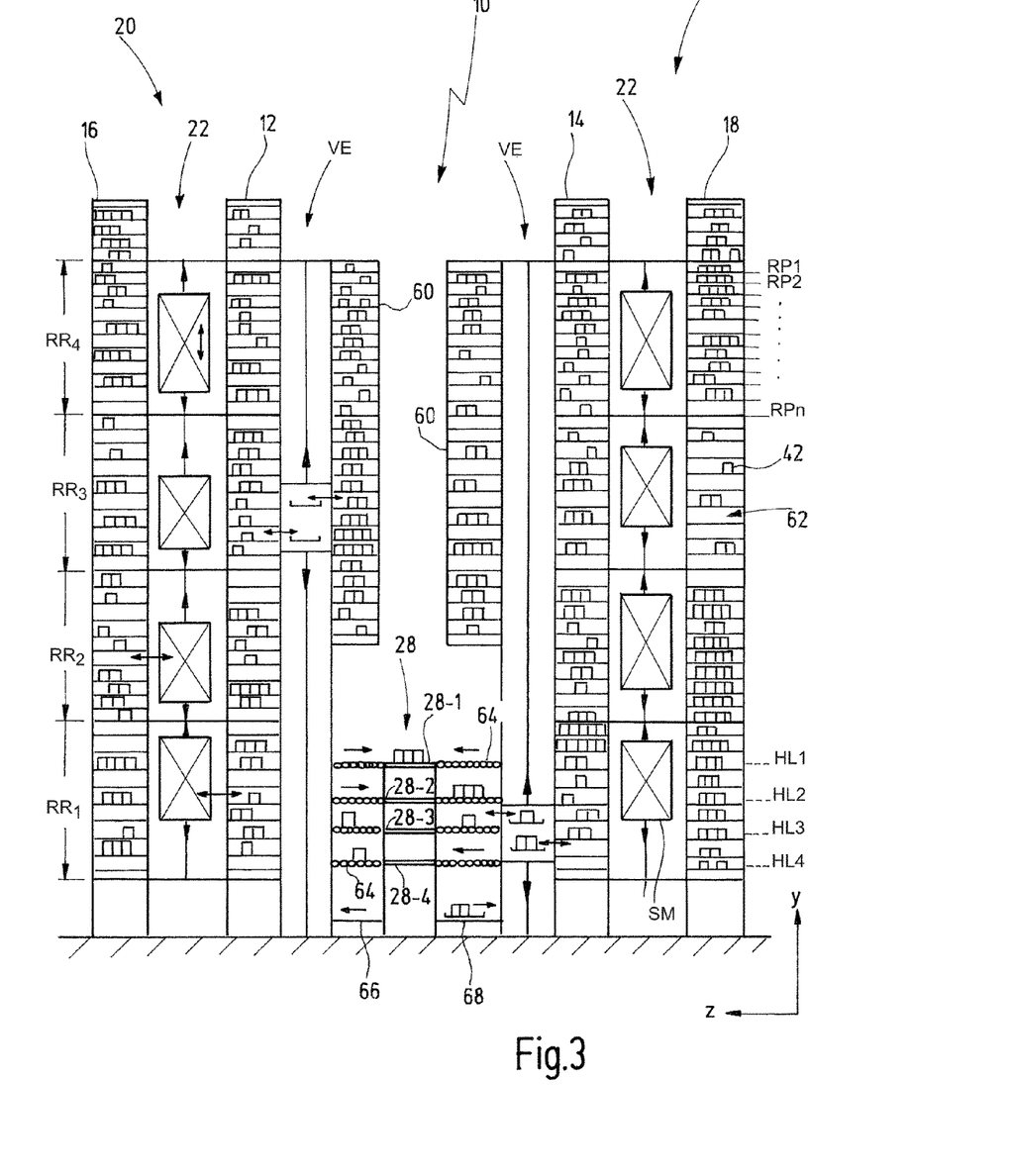
FIG. 3 shows a sectional view of the order-picking system of the present invention.

Optionally, another elevator 41 can be provided at an end of the central conveyor 28, the other lift being illustrated by dots in FIG. 1, the function of which will become clear in the context of FIG. 3.

Figure 2:
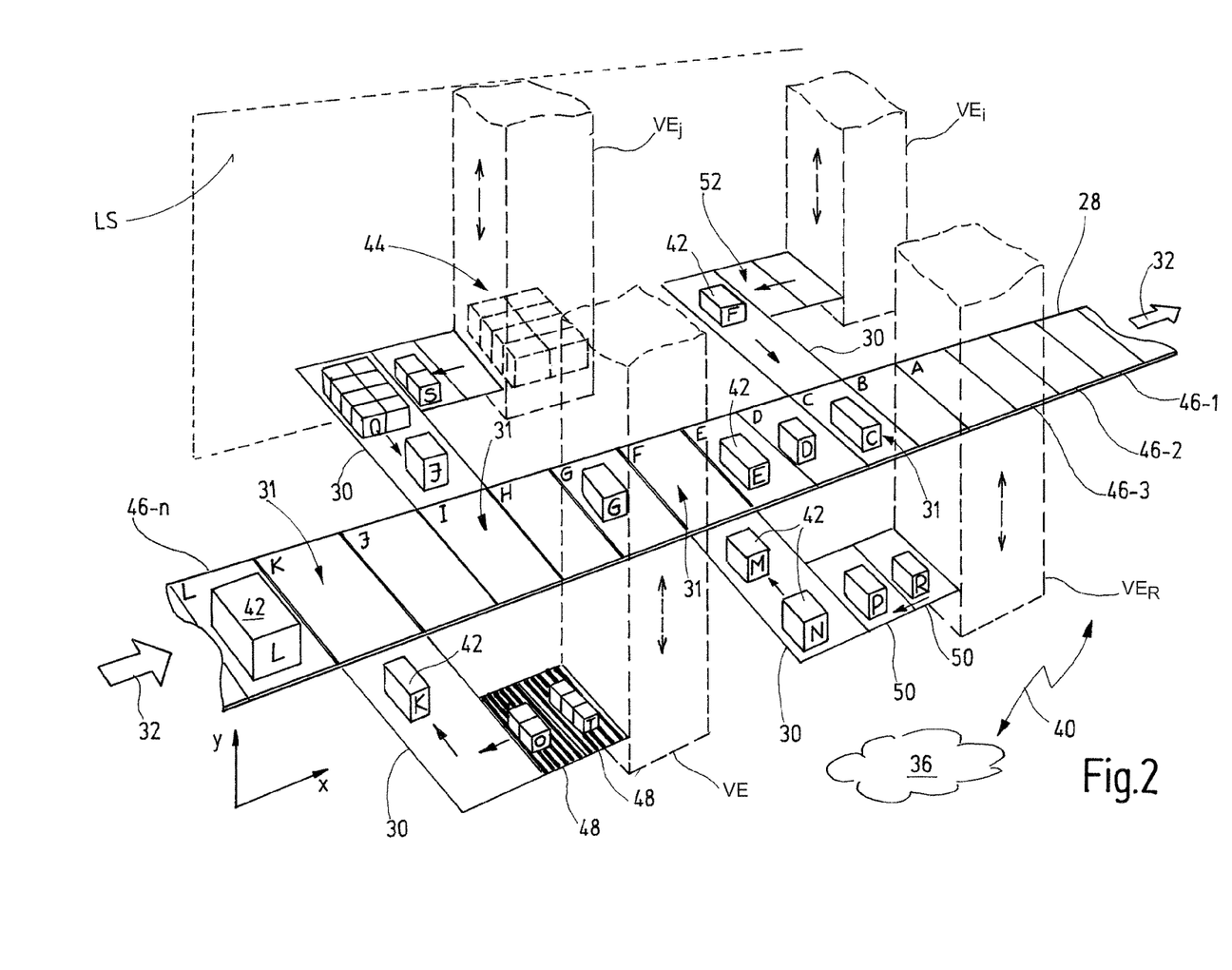
FIG. 2 shows a perspective view of a central conveyor.

With reference to FIG. 2 a perspective view into a warehouse aisle 26 of another embodiment of an order-picking system in accordance the present invention is illustrated.

Vertical elevators VE as well as longitudinal sides LS are indicated by dashed lines.

A central conveyor 28 as well as conveyor tracks 30 and additional (optional) roller conveyors 48 or belt conveyors 50 are illustrated by solid lines. Further, article and packing units 42 are illustrated, which are designated by letters for illustrating purposes, in order to allow explanation of the sequence to be generated in a facilitated manner.

In the vertical elevator $VE_j$ one pallet layer 44 consisting of article units 42 is exemplarily illustrated. However, the load suspension devices as well as the load supports are not illustrated. The unloading devices mentioned above are capable of isolating individual article units from one pallet layer 44 and deliver them from the elevator. This process happens in a fully-automated manner. Subsequently, partially unloaded load supports can be stored back into the racks.

The central conveyor 28 is divided into a plurality of windows 46 (46-1, 46-2, . . . , 46-n).

A warehouse management computer 36 assigns to each window 46 one article unit, packing unit or storage unit 42. For the purpose of a simplified illustration, a sequence of windows 46 is designated by continuing letters of the alphabet (A, B, C, . . . , L).

The windows A and B are (still) empty. These windows A and B are supplied with corresponding article units A and B by vertical elevators being located downstreams, which are not shown in the FIG. 2. The windows C, D and E are already loaded with the associated articles C, D and E.

The window F in turn is empty. The associated article F is delivered via the vertical elevator $VE_i$. As soon as the window F reaches the corresponding handing-over point 31, the article F is handed over to the window F.

Also, the empty windows H, I and J will be delivered by vertical elevators (not depicted), being located downstreams, with corresponding articles.

The vertical elevator $VE_k$ has already delivered the articles M, N, P and R. The injection of the article M into the window M, which is not depicted in FIG. 2, happens as soon the window M (not depicted) passes the handing-over point 31 associated with the vertical elevator $VE_k$.

With reference to FIG. 3, a sectional view of another embodiment of the order-picking system 10 of the present invention is shown, wherein a warehouse aisle 26 is viewed in an x-direction. In FIG. 3, the subdivision of the warehouse 20 in preferably different rack regions (RR1-RR4) can be recognized easily. Each of the rack regions comprises particularly a plurality of rack planes (RP1-RPn).

The storage machines SM can also move in x- and y-direction. The number of storage machines per aisle can be selected freely. The exchange of load supports between the storage machines SM and a rack location 62 happens here in the z-direction, whereby each of the storage machines SM is equipped with at least one, and preferably four to six, load suspension devices (not shown). The vertical elevators can be moved in the y-direction. The load suspension devices (not shown) of the vertical elevators VE can receive and deliver load supports in the z-direction. With the embodiment shown in FIG. 3 the vertical elevators VE comprise additional storage locations 62 in terms of a "rucksack" 60 serving as an additional buffer. In the buffers 60 so-called fast-moving items, i.e. articles (A articles), which are needed frequently, are stored in order to shorten the ways towards the workstation (not shown). Thereby, also the storage machines SM can be assisted, which then are not required for transporting the load supports from storage locations, which are sometimes located remote, to the handing-over locations.

Further, not only one central conveyor 28, but four central conveyors 28-1, 28-2, 28-3 and 28-4 arranged on top of each other, are used with the embodiment illustrated in FIG. 3. The respective central conveyors are arranged at handing-over levels HL1-HL4. At the same height, corresponding conveyor tracks 64 are provided which can correspond to the conveyor elements 30, 48 and 50, or the conveyor segment 52 of FIG. 2.

Further, optional conveyor lines 66 and 68 are illustrated, which extend in the x-direction and serve for transporting loaded load supports. While one vertical elevator VE delivers articles, for example, to the lower most central conveyor 28-4, it can receive loaded load supports for storing them into the warehouse 20. Of course, the vertical elevator VE can deliver simultaneously to two central conveyors as well. The number of load suspension devices, which are arranged on top of each other, of the vertical elevators VE can be chosen arbitrarily. Thus, it is possible to even serve more than two central conveyors at the same time.

As an alternative to the conveyor lines 66 and/or 68, also shifting cars can be used as well, which are preferably guided by racks. The shifting cars (not shown) are particularly arranged beneath the buffers 60, so that load supports, preferably by means of a dual cycle (delivery of a loaded load support, and receipt of an empty load support) can be exchanged with the load suspension device(s) of the vertical elevator(s). In this context, movements of the vertical elevator can be saved.

Further, it is clear that the central conveyor disclosed here could also be used with other load supports, such as containers.

Figure 4:
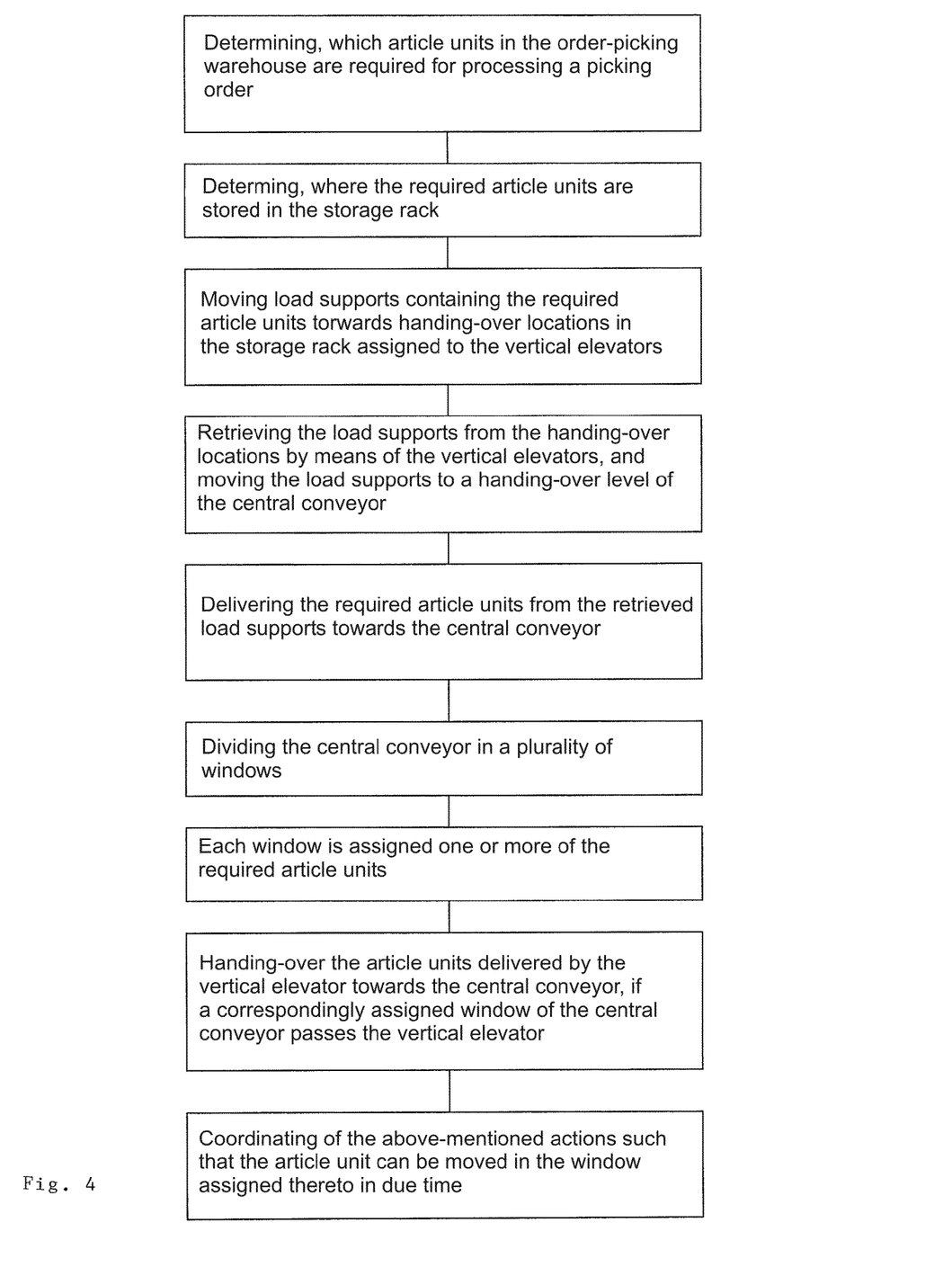
FIG. 4 shows a flow chart of a method in accordance with the present invention.

With reference to FIG. 4 the method of the present invention is schematically illustrated.

In a step S1 it is determined, which of the article units in the order-picking warehouse is required for processing a picking order. Particularly, one tries in advance to "match" (generation of batches) several orders (having, for example, similar articles and/or packing structures). As a result, less movements and storage cycles, particularly at the elevators, are needed. Articles can be delivered several times by one and the same tray, while it is located in the elevator. Then, the elevators only conduct small lift movements. The batch factor is increased. Many orders are processed in parallel. In another step S2 it is determined, where the required article units are stored in the storage rack.

In a step S3, load supports containing the required article units are moved to handing-over locations, which are assigned to the vertical elevators, within the storage rack.

In a step S4, the load supports are retrieved at the handing-over locations by means of the vertical elevators, and moved to a handing-over level of the central conveyor.

In a step S5, the required article units are delivered from the retrieved load supports towards the central conveyor.

In a step S6, the central conveyor gets divided into a plurality of windows.

In a step S7, each window gets assigned one or more of the required article units.

In a step S8, article units delivered from the vertical elevator are handed over towards the central conveyor, if a correspondingly assigned window of the central conveyor passes the vertical elevator.

In a step S9, all the above-mentioned actions are coordinated such that the article units are moved towards the window assigned thereto in due time.

A lot of advantages can be achieved by the order-picking system described here:

There is almost no requirement to the characteristics (such as shape) of the products. One is independent of size, weight and packaging.

The provision of the articles happens in an automated manner. Only articles which are required are moved.

The article assortment can be formed flexible. One can rely on a diversity of articles which is almost unlimited.

As a rule, a tray always represents a batch. Cracking of a batch is not required. If a tray is exchanged, the batch exchange is registered via the IT controlling.

The articles are handled carefully. They are either carried or, preferably, moved on conveyor belts (flat). Line and point contacts during the transport can cause the articles to block, and thus interrupt the stream.

If the assortment of article increases, simply more storage locations are provided in the warehouse. This is the only requirement.

The filling of the trays can happen at an arbitrary location within the warehouse, but preferably in parallel to the order-picking process. The trays can be stored in arbitrary storage locations. The entire stock of articles can be located exclusively on trays. Movement of trays happens only due to a direct picking-order request.

The delivery of articles can happen at arbitrary locations. There is no need to orientate them.

A number of articles can be delivered from the tray at the same time.

Articles can be buffered through the conveyor tracks (buffer, for example, at times of delay, troubles, etc.). There is a decoupling between the retrieval from the warehouse and a cycled handing-over to the central conveyor. The vertical elevators, together with their unloading devices, can continue work without interruptions. The vertical elevator does not need to wait for the delivery of the article towards the central conveyor.

The invention claimed is:

1. An automated order-picking system, having an integrated sorting function, for conveying article units towards a workstation in accordance with a predetermined sequence of a picking order, the system comprising:

at least one storage rack having a plurality of storage locations for receiving load supports, on which or in which article units are stored, wherein the storage rack is divided into rack regions, wherein each of the rack regions comprises a plurality of rack planes which respectively comprise a plurality of the storage locations being arranged side-by-side;

at least one central conveyor, being arranged along a first longitudinal side of the storage rack, the central conveyor being divided into a plurality of windows;

a number of vertical elevators being arranged one behind the other along the first longitudinal side of the storage rack, each of the vertical elevators respectively comprises one load suspension device for receiving and delivering at least one of the load supports, wherein each of the vertical elevators is coupled to the central conveyor on a handing-over level;

and at least one storage machine, which is movable horizontally and vertically along a second longitudinal side of the at least one storage rack for moving the load supports between the storage locations and handover locations in the at least one rack, which are arranged opposite to the vertical elevators; and a superordinated control device for controlling the vertical elevators such that the vertical elevators retrieve the load supports provided at the handover locations in the at least one storage rack, transport the load supports to the handing-over level, and deliver, at a predetermined time, one or more article units, which are stored in or on the retrieved load supports, towards the at least one central conveyor, so that all of the article units, which are required for the processing of the picking order at the workstation, are located on the at least one central conveyor in accordance with the pre-determined sequence, after the at least one central conveyor has passed all of the vertical elevators.

2. The automated order-picking system of claim 1, wherein the at least one central conveyor is a conveyor belt.

3. The automated order-picking system of claim 1, wherein the at least one central conveyor is arranged between two storage racks.

4. The automated order-picking system of claim 1, wherein a further conveyor is arranged between each of the vertical elevators and the at least one central conveyor, so that the control device can convey the article units, which have been delivered from one of the vertical elevators towards the further conveyor, to pre-determined windows on the at least one central conveyor.

5. The automated order-picking system of claim 4, wherein the further conveyor is a segmented conveyor track.

6. The automated order-picking system of claim 1, wherein the at least one central conveyor comprises central conveyors being arranged on top of each other.

7. The automated order-picking system of claim 1, wherein a manual unloading station is provided at an end of the at least one central conveyor, arranged opposite to the workstation, wherein the unloading station is supplied with the load supports by at least one of the vertical elevators.

8. The automated order-picking system of claim 7, wherein an additional elevator is provided between the manual unloading station and the at least one central conveyor allowing distribution of manually unloaded article units towards the at least one central conveyors in different heights.

9. The automated order-picking system of claim 1, wherein each window has assigned one of the article units required for the processing of the picking order.

10. The automated order-picking system of claim 1, wherein each of the vertical elevators is movable only in a vertical direction.

11. The automated order-picking system of claim 1, wherein the pre-determined sequence is a packing sequence.

12. The automated order-picking system of claim 1, wherein the second longitudinal side of the at least one storage rack is arranged oppositely to the first longitudinal side of the at least one storage rack.

13. A method for providing in a pre-determined sequence different article units of an order-picking system, which comprises at least one storage rack having a plurality of storage locations adapted to receive load supports, which contain the different article units, a plurality of vertical elevators arranged along a first longitudinal side of the at least one storage rack, and at least one central conveyor for conveying article units towards a workstation in accordance with the pre-determined sequence, wherein the central conveyor is arranged along the first longitudinal side of the storage rack, wherein the method comprises the following steps:

determining, which of the article units in the order-picking system are required for processing a picking order in the pre-determined sequence;

determining storage locations of the required article units stored in the at least one storage rack;

moving such load supports, which contain the required article units, from the determined storage locations by means of a horizontally and vertically movable storage machine provided at a second longitudinal side of the at least one rack to handing-over locations within the storage rack, which are arranged opposite to and are assigned to the vertical elevators;

retrieving the load supports from the handing-over locations by means of the assigned vertical elevators, and moving the retrieved load supports to a handing-over level of the at least one central conveyor;

delivering the required article units from the retrieved load supports towards the at least one central conveyor;

dividing the at least one central conveyor into a plurality of windows;

assigning to each of the windows one of the required article units;

handing over the required article units from the vertical elevators to the at least one central conveyor, when the correspondingly assigned windows of the at least one central conveyor pass a corresponding one of the vertical elevators; and coordinating all of the above-mentioned actions such that the required article units are moved to the assigned windows in the pre-determined sequence in due time.

14. The method of claim 13, wherein the delivery of the required article units from the retrieved load supports towards the at least one central conveyor happens at the vertical elevators in an automated manner.

15. The method of claim 14, wherein the delivery is assisted by a tray unloading device cooperating with a load suspension device of a respective one of the vertical elevators.

16. The method of claim 13, comprising the additional steps of:

determining, to which of the vertical elevators a load support is to be handed over; and moving the load support towards a corresponding handing-over location.

17. The method of the claim 13 comprising the additional steps of:
   determining, whether several load supports in the at least one storage rack contain one of the required article units; and
   selecting one of the vertical elevators and one of the several load supports of the so-determined load supports, so that the one of the article units located on or in the selected one load support is moved towards the central conveyor within a time frame set by the step of coordinating.

18. The method of the claim 13, wherein the required article units are packed into shipping units at the workstation, wherein the article units to be packed are trans-ported to the workstation via the at least one central conveyor.

* * * * *